No. 849,302. PATENTED APR. 2, 1907.
E. V. WHELCHEL.
BRAKE.
APPLICATION FILED MAY 23, 1906.

Witnesses
Frank B. Hoffman
P. M. Smith

Inventor
E. V. Whelchel,
By Victor J. Evans
Attorney

UNITED STATES PATENT OFFICE.

ESTON V. WHELCHEL, OF ROSSVILLE, GEORGIA.

BRAKE.

No. 849,302.     Specification of Letters Patent.     Patented April 2, 1907.

Application filed May 23, 1906. Serial No. 318,396.

*To all whom it may concern:*

Be it known that I, ESTON V. WHELCHEL, a citizen of the United States, residing at Rossville, in the county of Walker and State of Georgia, have invented new and useful Improvements in Brakes, of which the following is a specification.

This invention relates to wheel-brakes, the object of the invention being to provide a simple and effective brake applicable to any wheeled vehicle, but especially designed for use in connection with pneumatic tires to prevent injuring the same, the brake hereinafter described embodying a construction which permits any desired degree of resistance to be offered to the operation of the brake-shoe and which also provides against any rattling or jolting or jarring of the vehicle ordinarily produced when the brake shoe or shoes are brought into contact with the tires.

With the above and other objects in view the invention consists in the novel construction, combination, and arrangement of parts hereinafter more fully described, illustrated, and claimed.

Figure 1:
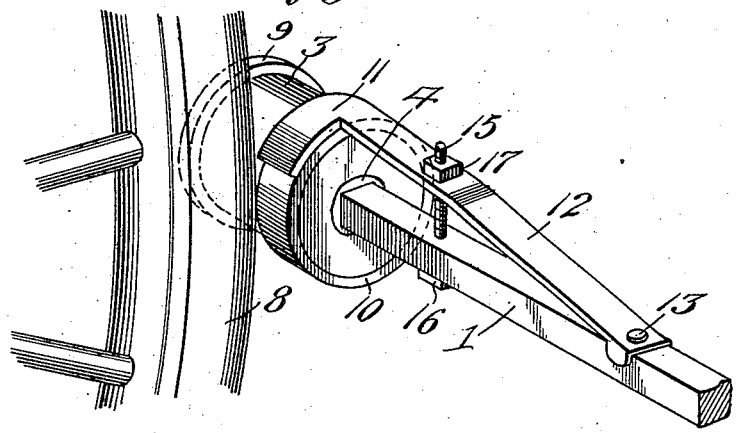
Figure 2:
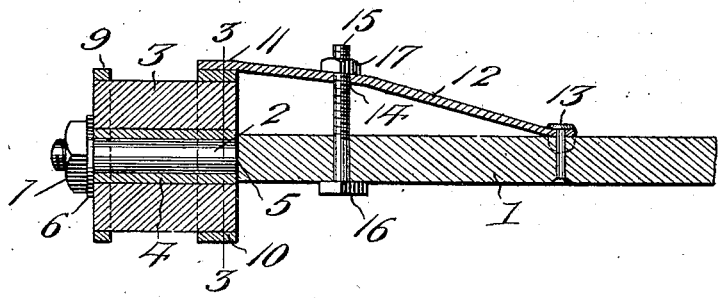
Figure 3:
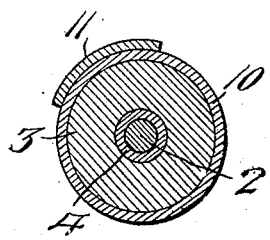

In the accompanying drawings, Figure 1 is a perspective view showing the improved brake in its relation to a wheel-tire. Fig. 2 is a longitudinal section through the brake. Fig. 3 is a cross-section on the line 3 3 of Fig. 2.

Referring to the drawings, 1 designates the brake-beam, one end of which is provided with a journal portion 2, upon which is mounted a roller brake-shoe 3 of any suitable material, the same being provided with an interior bushing 4, fast therein and rotatably mounted on the journal 2. The roller-shoe 3 is confined between a shoulder 5 at the inner end of the journal 2 and a washer 6 at the opposite side of the shoe, held in place by a nut 7, secured upon the threaded extremity of the journal 2, as shown in Fig. 2. The roller-shoe 3 is adapted to work in direct contact with the outer or curved surface of a pneumatic tire (shown at 8) and is preferably provided at its outer and inner ends with flanges or bands 9 and 10. Under the preferred embodiment of this invention the flanges 9 and 10 are in the form of metal bands or hoops encircling the shoe 3 and made fast thereon. The inner band 10 is preferably made wider than the outer band to provide a cylindrical friction-surface in contact with which works an arcuate friction-shoe 11, carried by one end of a spring 12.

The shoe 11 is carried by the free end of the spring 12, while the opposite end of said spring is secured to the beam 1 at the point 13. Intermediate its ends the spring is provided with a hole 14 for the reception of a tension device, which is shown in the form of a threaded bolt 15, provided with a head 16 and a nut 17, the said bolt passing through the spring 12 and also through the beam 1, so that by tightening the nut 17 the spring 12 is forced toward the beam 1, thus enabling any desired tension or pressure to be applied to the shoe 11 against the friction-band 10 on the roller-shoe 3. In this way any desired resistance to the rotation of the roller-shoe may be obtained.

Any suitable brake connections may be employed for moving the brake-beam and the shoe or shoes carried thereby toward and away from the wheels, said connections forming no part of this invention. When the roller 3 is moved into contact with the tire, it rolls against the tire instead of scraping, and thus avoids injuring the tire. Furthermore, the construction described obviates the jarring and jolting which ordinarily takes place when vehicle-brakes are applied, the roller-shoe 3 revolving under the influence of the tire and applying braking pressure thereto without noticeable vibration.

I claim—

1. A wheel-brake comprising a roller-shoe adapted to work in contact with a wheel rim or tire, said shoe having bands secured to its ends and an adjustable friction device adapted to bear upon one of said bands for resisting the rotation of said roller-shoe.

2. A wheel-brake comprising a roller-shoe mounted to rotate upon a bearing or support, an adjustable friction device for resisting the rotation of said roller-shoe, said friction device comprising a spring-arm carrying a friction-shoe and a threaded bolt passed through said spring-arm to hold said friction device in adjusted position, substantially as described.

In testimony whereof I affix my signature in presence of two witnesses.

ESTON V. WHELCHEL.

Witnesses:
    J. P. TUCKER,
    CHAS. SIMMONS.